United States Patent
Farag et al.

(10) Patent No.: US 7,196,690 B2
(45) Date of Patent: *Mar. 27, 2007

(54) INPUT DEVICE OFF TABLE SWITCH

(75) Inventors: Abraham S. Farag, Palo Alto, CA (US); Bartley K. Andre, Menlo Park, CA (US); Benjamin B. Lyon, Kensington, CA (US); Richard D. Cappels, Sr., San Jose, CA (US); Jeffrey B. Doar, Fremont, CA (US)

(73) Assignee: Apple Inc., Cupertino, CA (US)

( * ) Notice: Subject to any disclaimer, the term of this patent is extended or adjusted under 35 U.S.C. 154(b) by 229 days.

This patent is subject to a terminal disclaimer.

(21) Appl. No.: 10/948,534

(22) Filed: Sep. 22, 2004

(65) Prior Publication Data

US 2005/0052411 A1 Mar. 10, 2005

Related U.S. Application Data

(63) Continuation of application No. 09/675,630, filed on Sep. 29, 2000, now Pat. No. 6,831,628.

(51) Int. Cl.
*G09G 5/08* (2006.01)

(52) U.S. Cl. ............... 345/166; 345/157; 345/158; 345/159; 345/160; 345/161; 345/162; 345/163; 345/164; 345/165

(58) Field of Classification Search ............. 345/157, 345/158, 159, 160, 161, 162, 163, 164, 165, 345/166
See application file for complete search history.

(56) References Cited

U.S. PATENT DOCUMENTS 5,673,066 A * 9/1997 Toda et al. ............... 345/157
5,994,710 A * 11/1999 Knee et al. ............... 250/557
6,040,820 A   3/2000 Choi ........................ 345/156
6,147,679 A   11/2000 Numata et al. ........... 345/163
6,831,628 B1 * 12/2004 Farag et al. .............. 345/157

FOREIGN PATENT DOCUMENTS

JP       02001142636 A  *  5/2001

* cited by examiner

*Primary Examiner*—Kee M. Tung
*Assistant Examiner*—Tam Tran
(74) *Attorney, Agent, or Firm*—Blakely, Sokoloff, Taylor & Zafman LLP

(57) ABSTRACT

According to one aspect of the invention, a movable cursor control device is provided for controlling a cursor on a display screen of a digital processing system. One exemplary cursor control device comprises a housing, an electromagnetic emitting device coupled to the housing, and an electromagnetic detector coupled to the housing. The electromagnetic detector detects reflections of signals emitted from the electromagnetic emitting device and determines when the housing has been lifted from a surface. In another aspect of the invention, an exemplary method is provided for controlling a cursor on a display screen of a digital processing system. The exemplary method includes holding the cursor relative to an object on the display screen using a cursor control device activated by a user, detecting that the user no longer activates the cursor control device, and detecting that the user has lifted the cursor control device from a surface when the cursor control device is no longer activated by the user. Further, the method allows for continuing to hold the cursor relative to the object after detecting that the user no longer activates the cursor control device.

29 Claims, 7 Drawing Sheets

INPUT DEVICE OFF TABLE SWITCH

This application is a continuation application of U.S. patent application No. 09/675,630, filed Sep. 29, 2000 now U.S. Pat. No. 6,831,628.

FIELD OF THE INVENTION

The present invention relates to cursor control devices. In particular, the present invention provides a method and apparatus for controlling a cursor on a display screen of a digital processing system.

INTRODUCTION AND BACKGROUND

The use of a cursor control device to control a cursor on a display screen of a digital processing system has become almost universal. The cursor control device, commonly a mouse, trackball, or stylus device, is actuable by a user to generate a signal when transmitted to the digital processing system. The digital processing system then utilizes the signal to control the cursor on the screen. For instance, the cursor may be used to select an object on the screen, move the selected object on the screen, scroll an on-screen document, etc.

Typically, when moving the object on the screen, the user first points the cursor to the object using the cursor control device. Then, the user activates a switch (e.g., a mouse button) of the cursor control device to hold the cursor on the object (e.g., by pressing the mouse button) and moves the cursor control device as necessary to get the object into a desired position while keeping the switch in the activated position. Once the object is at the desired position, the user deactivates the switch (e.g., by releasing the mouse button). However, when moving the cursor control device, the user may reach the end of the surface on which the cursor control device is moved (e.g., a mouse pad, a computer desk, etc.) before the object gets to the desired position on the screen. In this situation, the user would typically lift the cursor control device from the surface when reaching the end of the surface and reposition the cursor control device on the surface in order to continue moving the cursor control device until placing the object at the desired position. It is common for users to unintentionally deactivate the switch (e.g., by releasing the mouse button) while lifting the cursor control device.

Existing cursor control devices do not allow the user to extend selection of the object after deactivating the switch due to a necessary repositioning of the cursor control device on the surface. As a result, the user loses the object and must reinitiate the selection of the object on the screen, thereby causing the inconvenience to the user and slowing the move operation. In addition to the above disadvantages, forcing the user to constantly keep the switch of the cursor control device in the activated position (by, for example, constantly keeping the mouse button down) while manipulating with the cursor control device is ergonomically undesirable. Thus, it would be advantageous to provide a mechanism allowing to keep the cursor on the object while lifting the cursor control device in the air to reposition.

In order to extend holding capability while lifting the cursor control device in the air, the digital processing system should receive a signal indicating that the cursor control device has been lifted from the surface. Known cursor control devices include mechanical switches to detect an off-table movement. For example, a mouse may rely on a mechanical tracking ball to indicate that the mouse is off the table. However, mechanical switches are not always reliable because they depend to a significant degree on a fairly delicate compromise about how mechanical forces are developed and transferred. In addition, mechanical switches do not provide a sufficiently fast indication of an off-table state of the cursor control device. Furthermore, mechanical switches require mechanical coupling to the surface and are subject to mechanical wear. Therefore, it would be desirable to provide a reliable non-mechanical off-table switch which will quickly signal the lifting of the cursor control device from the surface.

SUMMARY OF THE INVENTION

According to one aspect of the invention, a movable cursor control device is provided for controlling a cursor on a display screen of a digital processing system. One exemplary cursor control device comprises a housing, an electromagnetic emitting device coupled to the housing, and an electromagnetic detector coupled to the housing. The electromagnetic detector detects reflections of signals emitted from the electromagnetic emitting device and determines when the housing has been lifted from a surface.

In another aspect of the invention, an exemplary method is provided for controlling a cursor on a display screen of a digital processing system. The exemplary method includes holding the cursor relative to an object on the display screen using a cursor control device activated by a user, detecting that the user no longer activates the cursor control device, and detecting that the user has lifted the cursor control device from a surface when the cursor control device is no longer activated by the user. Further, the method allows for continuing to hold the cursor relative to the object after detecting that the user no longer activates the cursor control device.

DETAILED DESCRIPTION

The present invention provides methods and apparatuses for controlling a cursor on a display screen of a digital processing system. In the following description, numerous specific details are set forth in order to provide a through understanding of the present invention. It will be obvious, however, to one skilled in the art that the present invention may be practiced without these specific details. In other instances, well-known control structures and coding techniques have not been shown in detail in order not to unnecessarily obscure the present invention.

Hardware Overview

Figure 1:
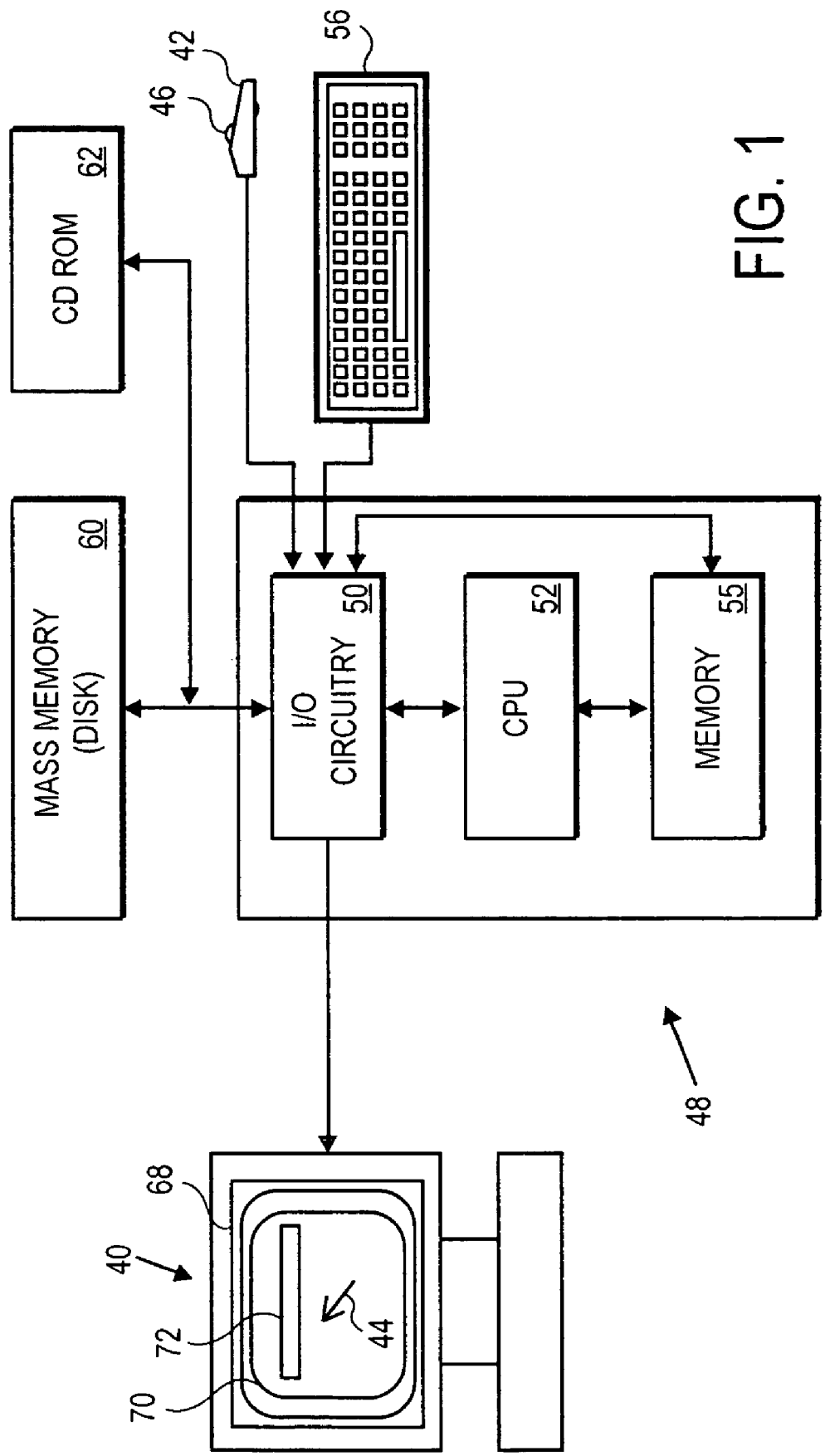
FIG. 1 is a block diagram of a digital processing system which provides for controlling a cursor on a display screen, in accordance with one embodiment of the present invention.

FIG. 1 is a block diagram of a digital processing system which provides for controlling a cursor on a display screen, in accordance with one embodiment of the present invention. The digital processing system includes a display means 40, such as a CRT monitor or a liquid crystal display (LCD), a plasma display, or other type of display device. The digital processing system further includes a cursor control device 42, such as a mouse, a track ball, joy stick, touchpad or other device for selectively positioning a cursor 44 on a display screen 68 of the display 40. Typically, the cursor control device 42 includes a signal generation means, such as a switch 46 (e.g., a mouse button, a mouse wheel, etc.) having a first position and a second position. The user of the digital processing system may use the switch 46 to generate signals directing the system to execute certain commands. As illustrated, the cursor control device 42 is coupled to a computer system 48.

The computer 48 comprises an input/output (I/O) circuit 50 which is used to communicate information in appropriately structured form to and from other portions of the computer 48. In addition, the computer 48 includes a central processing unit (CPU) 52 coupled to the I/O circuit 50 and a memory 55. These elements are those typically found in most general purpose computers, and in fact, computer 48 is intended to be representative of a broad category of data processing devices capable of generating graphic displays.

Also shown in FIG. 1 is a keyboard 56 to input data and commands into the computer 48, as is well known in the art. A magnetic mass memory disk 60 is shown coupled to I/O circuit 50 to provide additional storage capability for the computer 48. In addition, a CD ROM 62 is further coupled to the I/O circuit 50 for additional storage capacity. It will be appreciated that additional devices may be coupled to the computer 48 for storing data, such as magnetic tape drives, as well as networks, which are in turn coupled to other data processing systems.

As illustrated in FIG. 1, the display 40 includes the display screen 68 in which a window 70 is displayed. As is well known in the art, the window 70 may be in form of a rectangle or other well known shape, and may include a menu bar 72 disposed horizontally across the length of the window. As is well known, the movement of the cursor control device 42 may be translated by the computer 48 into movement of the cursor 44 on the display screen 70. The system illustrated in FIG. 1 is intended to represent a general digital processing system capable of controlling the cursor 44 on the display screen 70 using the cursor control device 42. It will be appreciated that the digital processing system represents only one example of a system, which may have many different configurations and architectures, and which may be employed with the present invention. In operation, the window based user interface of the present invention is generated and displayed using software stored in memory 55 and executed by the CPU 52, as is known.

Extended Selection of an Object of a Display Screen

Figure 2:
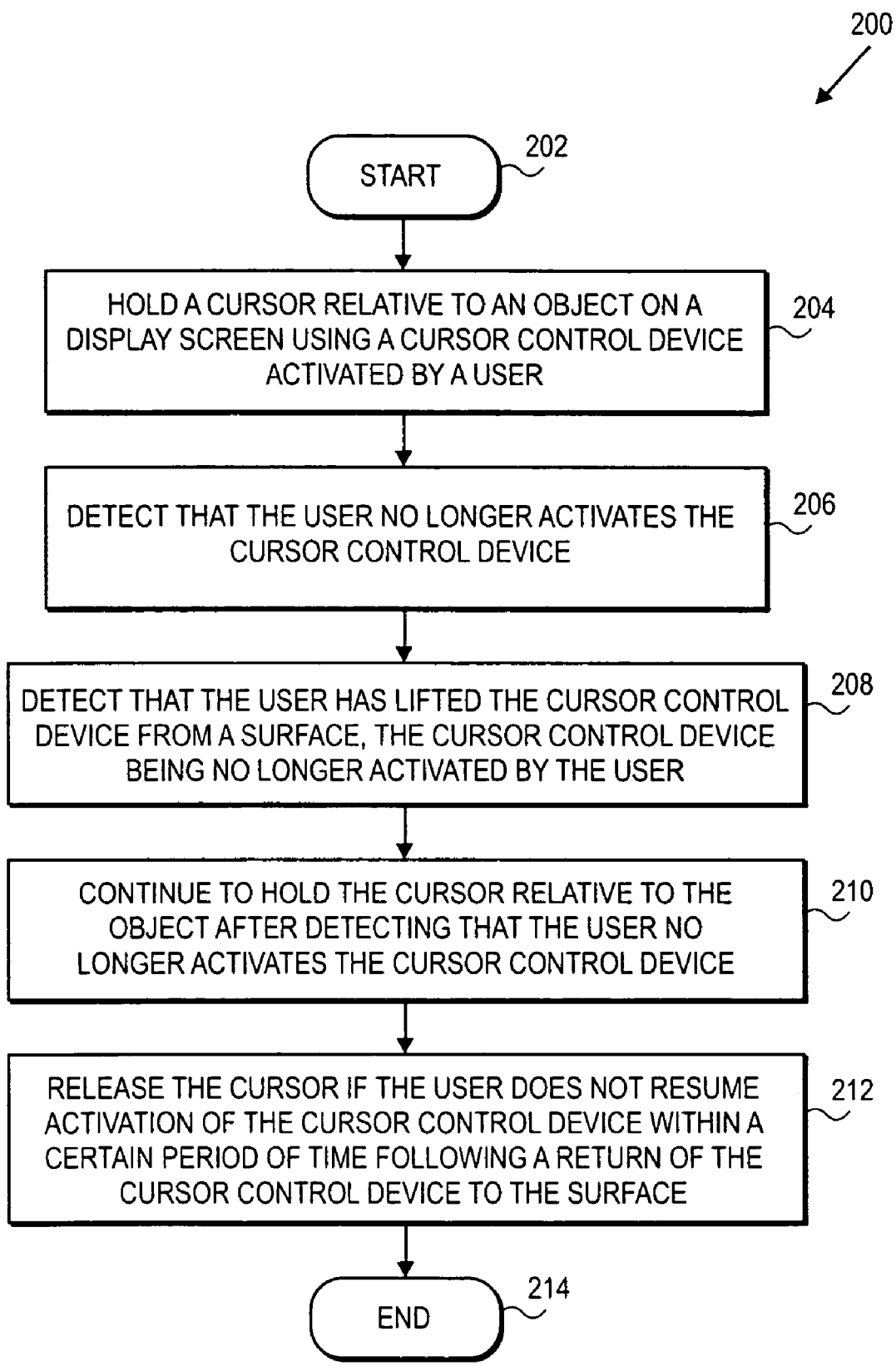
FIG. 2 is a flow diagram of a method for controlling a cursor on a display screen of a digital processing system, according to one embodiment of the invention.

FIG. 2 is a flow diagram of a method 200 for controlling a cursor on a display screen of a digital processing system, according to one embodiment of the invention. In this embodiment, the cursor is pointed to an object on a display screen and held relative to the object while manipulating with the object. The term "held relative to the object" means that the cursor may be placed at a certain position in relationship to the object. For example, the cursor may be placed over the object, next to the object, near the object, on the border of the object, etc. Holding the cursor relative to the object also includes keeping the cursor relative to the object while changing the position of the object on the screen. The object may be an icon, a block of text, an image, a scroll box in a scroll bar, or any other object displayed on the screen. Accordingly, changing the position of the object may occur when the object is moved from one position to another during, for example, a drag or scroll operation.

Referring to FIG. 2, method 200 begins with holding the cursor relative to the object on the display screen using a cursor control device activated by a user (processing block 204). The user "activates" the cursor control device by placing a switch associated with the cursor control device in a predetermined position and moving the cursor control device over the surface (e.g., a mouse pad, a desk, a table, etc.) while keeping the switch in the predetermined position. For instance, the cursor control device such as a mouse is activated when the user presses the button and moves the mouse while keeping the button pressed, thereby moving the selected object to a new position. That is, the user may move the mouse with the mouse button pressed in order to, for example, move an icon or other object during a drag operation or move a scroll box relative to a scroll bar during a scroll operation.

Next, method 200 continues with detecting that the user no longer activates the cursor control device (processing block 206). The cursor control device becomes inactivated when the user places the switch of the cursor control device into a position corresponding to an inactivated state of the cursor control device. This change in the switch position, detected by the cursor control device, generates a signal which is transmitted to the digital processing system. For example, when the user releases a mouse button, this change in the button position is detected by the mouse which generates a signal transmitted to the digital processing system. In one embodiment, the change in the button position occurs while the user is still moving the mouse to get the object to a desired position. Specifically, the change may occur when the user lifts the mouse in the air to reposition because of reaching the end of the surface.

At processing block 208, the lift of the cursor control device in an inactivated state is detected. In one embodiment, the user lifts the cursor control device in the air and then returns it to a new position on the surface to continue the move operation. In one embodiment, the cursor control device includes an off-table switch to detect the lift of the cursor control device from the surface. The off-table switch may be mechanical or optical. An exemplary optical off-table switch is described in greater detail below.

At processing block 210, the cursor is continued to be held relative to the object after detecting that the user no longer activates the cursor control device. In one embodiment, the cursor is kept relative to the object while the cursor control device is lifted in the air and then returned to the surface, thereby providing an extended selection of the object on the screen during the off-table state of the cursor control device. An exemplary method for providing an extended selection of an object on a screen is described in detail below in conjunction with FIG. 3.

Afterwards, at processing block 212, the cursor is released if the user does not resume the activation of the cursor control device within a certain period of time following the return of the cursor control device to the surface. In one embodiment, this period of time is determined using a set of timer values which indicate whether the user intends to release the object on the screen or to continue holding the cursor on the object (i.e., continue moving the object to the desired position).

Figure 3:
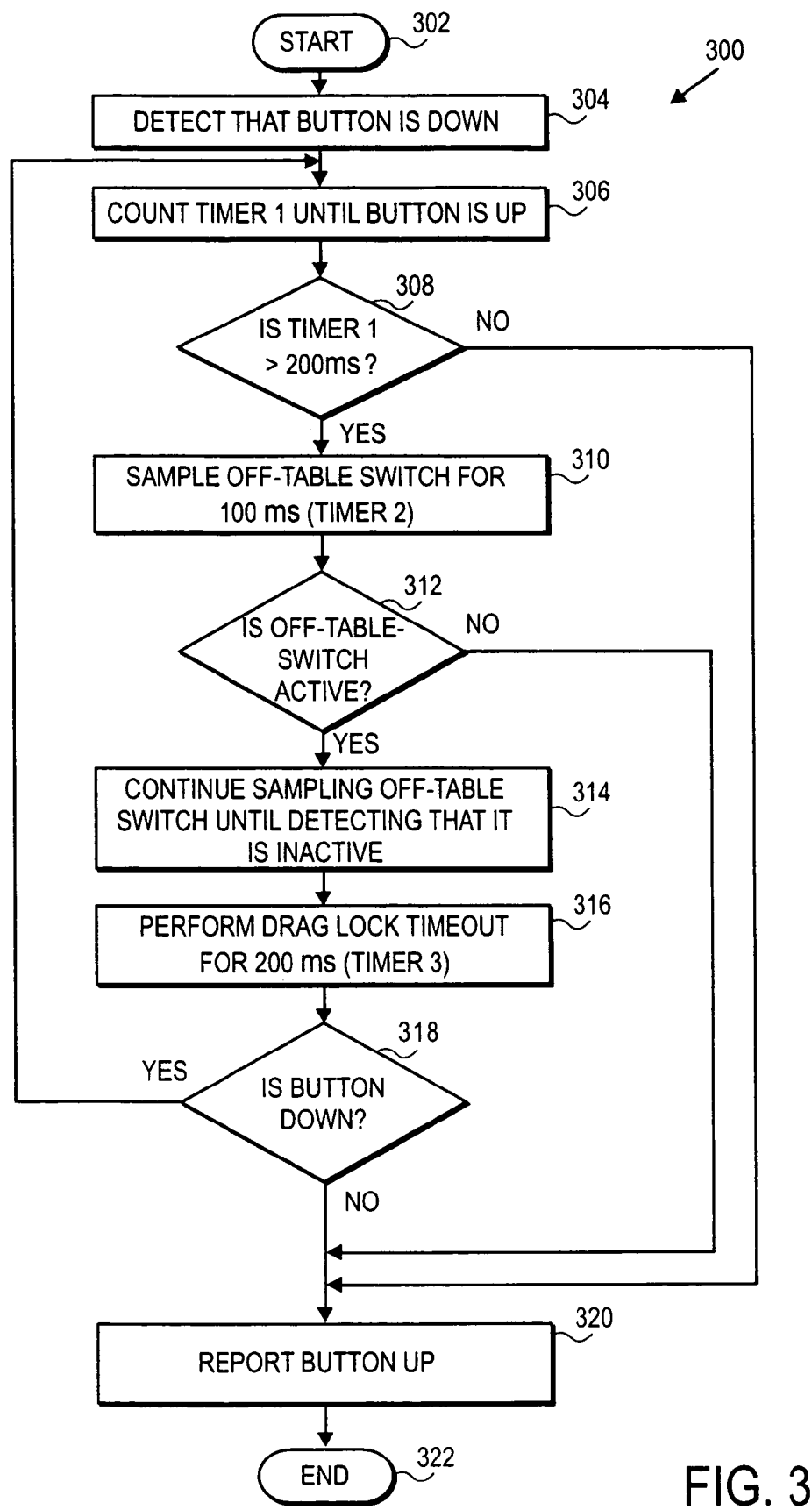
FIG. 3 is a flow diagrams of a method for providing an extended selection of an object on a display screen, according to one embodiment of the invention.

FIG. 3 is a flow diagrams of a method 300 for providing an extended selection of an object on a display screen, according to one embodiment of the invention. In this embodiment, a cursor control device detects various events initiated by a user via the cursor control device such as a mouse. Upon detecting such an event, the mouse generates a corresponding signal and transmits it to a digital processing system. The digital processing system then utilizes the signal to control a cursor on the screen.

When a user presses a mouse button, the user may intend to merely click (i.e., tap on the mouse button, by pressing and immediately releasing it) or double click (i.e., tap on the mouse button twice in rapid succession). Alternatively, the user may press the mouse button with the intent to move the mouse while manipulating with an object on the screen. Method 300 uses a set of timer values to predict the user intent with respect to the object in order to provide an extended selection of the object during the move operation.

Method 300 begins with detecting that a mouse button is pressed (processing block 304). As described above, pressing the button may indicate that the user intends to click or double click the button, or alternatively, it may indicate that the user intends to manipulate with the object on the screen. At block 306, a value of timer 1 is determined. Timer 1 is used to measure the time interval during which the button remains pressed by the user and is referred to as a button-down time counter. Timer 1 is counted until the button is released. That is, a loop is performed in which the mouse button is constantly checked to detect whether the mouse button is released. If the mouse button is not released (i.e., the button is still down), timer 1 is incremented, and the loop continues until the mouse button is released.

After detecting that the mouse button is released, a determination is made as to whether timer 1 exceeds 200 milliseconds (decision box 308). If timer 1 does not exceed 200 milliseconds, a click or double click is assumed, and at block 320, a signal is sent to the digital processing system to indicate that the mouse button has been released (i.e., the mouse button is up). Alternatively, if timer 1 exceeds 200 milliseconds, the selection of the object on the screen continues despite the release of the button. Next, a delay between releasing the mouse button and lifting the mouse from the surface (i.e., timer 2) is determined. An off-table state of the mouse is detected using an off-table switch. At block 310, the off-table switch is tested for a time interval of 100 milliseconds to determine whether the state of the off-table switch changes.

At decision box 312, a determination is made as to whether the off-table switch is in an active state. If the time interval of 100 milliseconds expires and the off-table switch is still inactive, no lift is assumed, and at block 320, a signal is sent to the digital processing system to report the release of the mouse button. Otherwise, if the off-table switch became active during the above time interval, the off-table switch is further tested until detecting that it is no longer active (block 314), which means that the user returned the mouse to the surface. The selection of the object on the screen continues during the lift of the mouse.

At block 316, drag lock timeout is performed for 200 milliseconds. During the time interval of 200 milliseconds, timer 3 is used to determine a delay between repositioning the mouse on the surface and re-activating the mouse. Timer 3 is referred to as a drag lock timeout counter. Periodically, during the above time interval, a determination is made as to whether the user reactivated the mouse by pressing the mouse button (decision box 318). If the determination is positive, the object on the screen remains selected, and flow returns to block 306. Accordingly, the extended selection of the object is provided, and the user is able to continue the move operation.

Alternatively, if timer 3 exceeds 200 milliseconds and the user has not reactivated the mouse, it is assumed that the user does not intend to continue with the move operation, and a signal is transmitted to the digital processing system to indicate the release of the mouse button (block 320).

Figure 4:
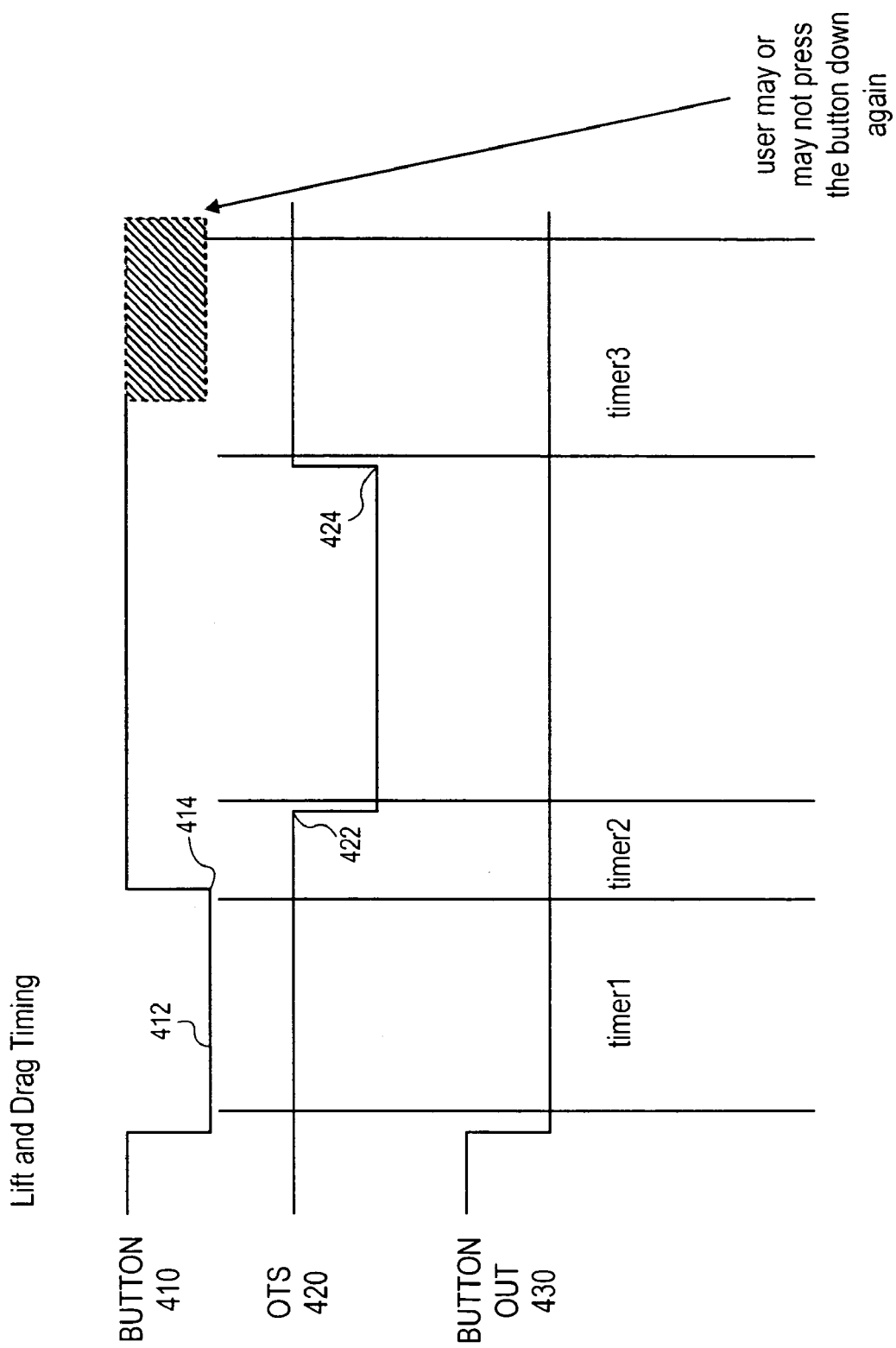
FIG. 4 is a timing diagram illustrating an extended drag operation, according to one embodiment of the invention.

FIG. 4 is a timing diagram illustrating an extended drag operation, according to one embodiment of the invention. Button 410 illustrates two states of the mouse: an activated state when the user keeps the mouse button pressed (i.e., the button is down) and an inactivated state when the button is released (i.e., the button is up). OTS 420 illustrates two states of an off-table switch: an active state when the off-table switch detects that the mouse is lifted in the air and an inactive state when the mouse is kept on the surface. Button out 430 illustrates an extended selection of the object which can be achieved using method 300 and a set of timer values as described above.

Referring to FIG. 4, the mouse button is kept pressed down during the time period represented by timer 1, as illustrated by line 412. As described above, timer 1 must exceed 200 milliseconds to indicate that the user intends to continue the move operation, as opposed to intending to click or double click the mouse button. At point 414, the mouse button is released, i.e., it goes up. Next, at point 422, the off-table switch becomes active because of the user lifting the mouse in the air. The delay between the release of the mouse button and the lift of the mouse should not exceed a time period identified by timer 2; otherwise, no lift of the mouse is assumed. When OTS 420 reaches point 424, the user returns the mouse to the surface, and the off-table switch becomes inactive. Further, during the time interval identified by timer 3, drag lock timeout is performed. The drag lock timeout provides for the extended selection of the object after the mouse is returned to the surface, even if the user does not re-activate the mouse. However, when the time interval identified by the timer 3 expires, the object can remain selected only if the user resumes the activation of the mouse, i.e. if the user presses the mouse button again.

Button out 430 demonstrates the desired output, at which the mouse button is being treated as activated (i.e., being down) beginning with the time when the user presses the button and continuing over the time interval during which the mouse is being lifted and then some time (timer 3) after the mouse is returned to the surface, even though in reality the user no longer keeps the mouse in the activated state.

Off-Table Switch

Figure 5:
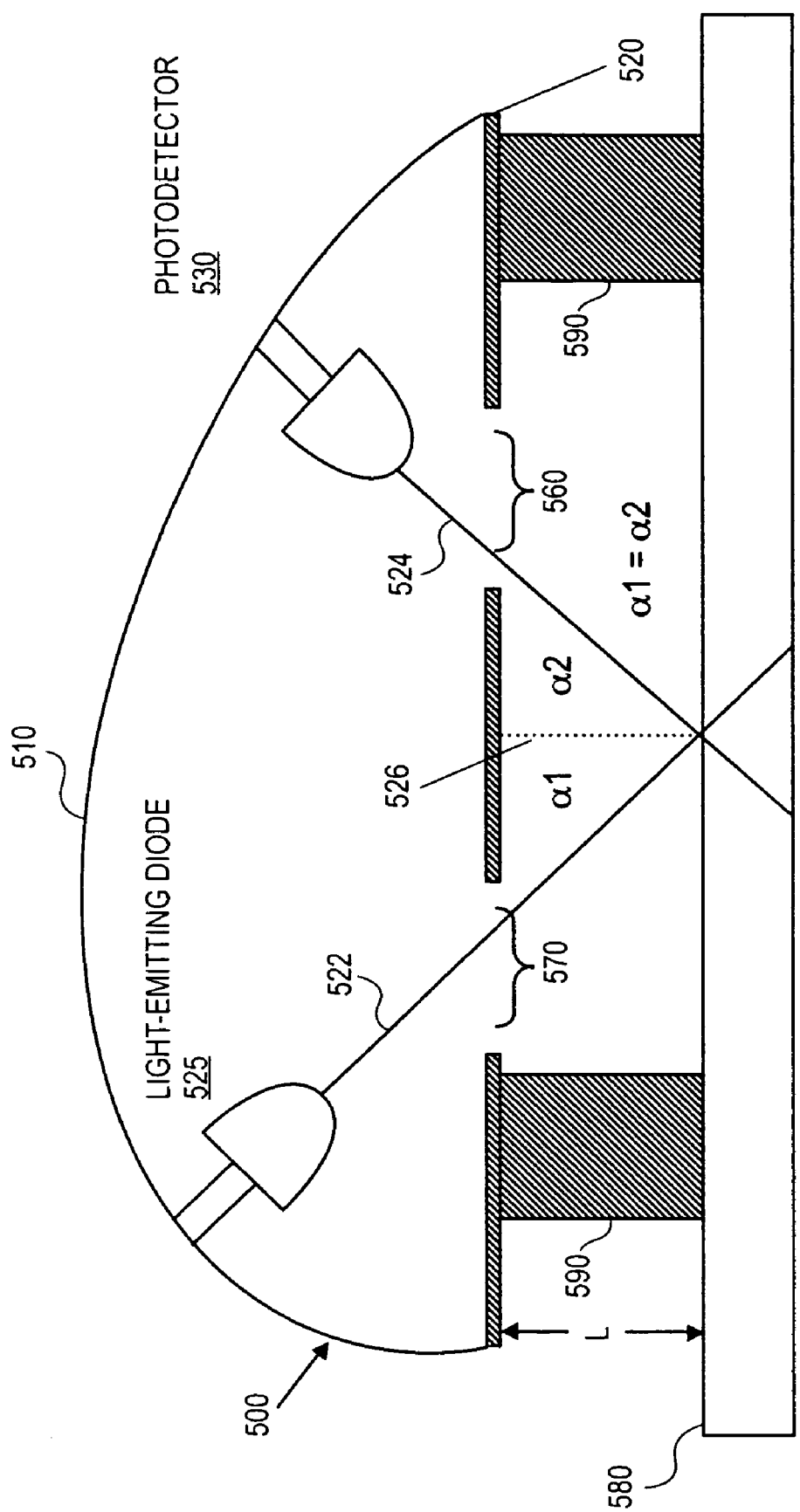
FIG. 5 is a block diagram of an architecture of a movable cursor control device, according to one embodiment of the invention.

FIG. 5 is a block diagram of an architecture of a movable cursor control device, according to one embodiment of the invention. The movable cursor control device includes a housing 500, an electromagnetic device such as a light-emitting diode (LED) 525, and an electromagnetic detector such as a photodetector 530. The housing 500 includes an upper wall 510 and a base 520. The base 520 has two apertures 560 and 570. Two spacers 590 are attached to the base 520. Spacers 590 prevent the base 520 from touching the surface 580 when the cursor control device is placed on the surface 580. The width of spacers 590 defines a distance L between base 520 and surface 580. Distance L is maintained when the cursor control device is placed on surface 580.

LED 525, photodetector 530 and apertures 560 and 570 are positioned according to a predefined geometrical arrangement. This geometric arrangement enables a specular reflection of signals emitted from LED 525 to be visible to photodetector 530 when the cursor control device is placed on surface 580, i.e., when apertures 560 and 570 are located distance L away from surface 580 due to spacers 590.

The specular reflection occurs when angles $\alpha 1$ and $\alpha 2$ are equal. $\alpha 1$ is the angle between the line of sight 522 of LED 525 and a line perpendicular to the surface 580, i.e., line 526. $\alpha 2$ is the angle between the line of sight 524 of photodetector 530 and line 526. Apertures 560 and 570 restrict paths of beams outgoing from LED 525 and beams incoming to photodetector 530 in such a way as to make angles $\alpha 1$ and $\alpha 2$ to be equal when the cursor control device is placed on surface 580. As a result, the reflection of signals emitted from LED 525 is visible to photodetector 530.

Figure 6:
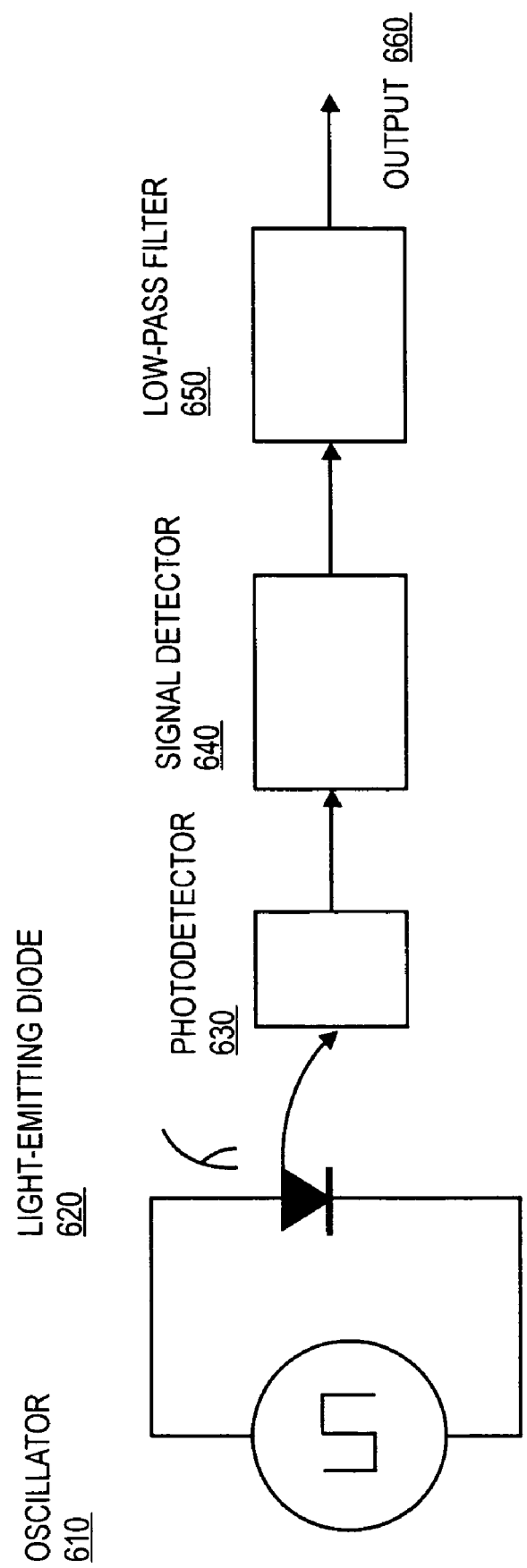
FIG. 6 is a block diagram of the functional arrangement of circuit elements of the movable cursor control device of FIG. 5, according to one embodiment of the invention.

FIG. 6 is a block diagram of the functional arrangement of circuit elements of the movable cursor control device of FIG. 5, according to one embodiment of the invention. In this embodiment, the cursor control device includes oscillator 610, LED 620, photodetector 630, signal detector 640 and low-pass filter 650.

Oscillator 610 generates pulses and applies them to LED 620 which, in turn, converts it into light. Photodetector 630 detects light emitted from LED 620 as well as light from other sources (e.g., day light) and outputs current flow according to light intensity. Signal detector 640 detects signals coming from photodetector 630, amplifies them and passes the amplified signals to low-pass filter 650. Low-pass filter 650 differentiates between signals coming from LED 620 and signals coming from other sources, and generates an output signal 660 indicating whether housing 510 is lifted in the air from surface 580.

Figure 7:
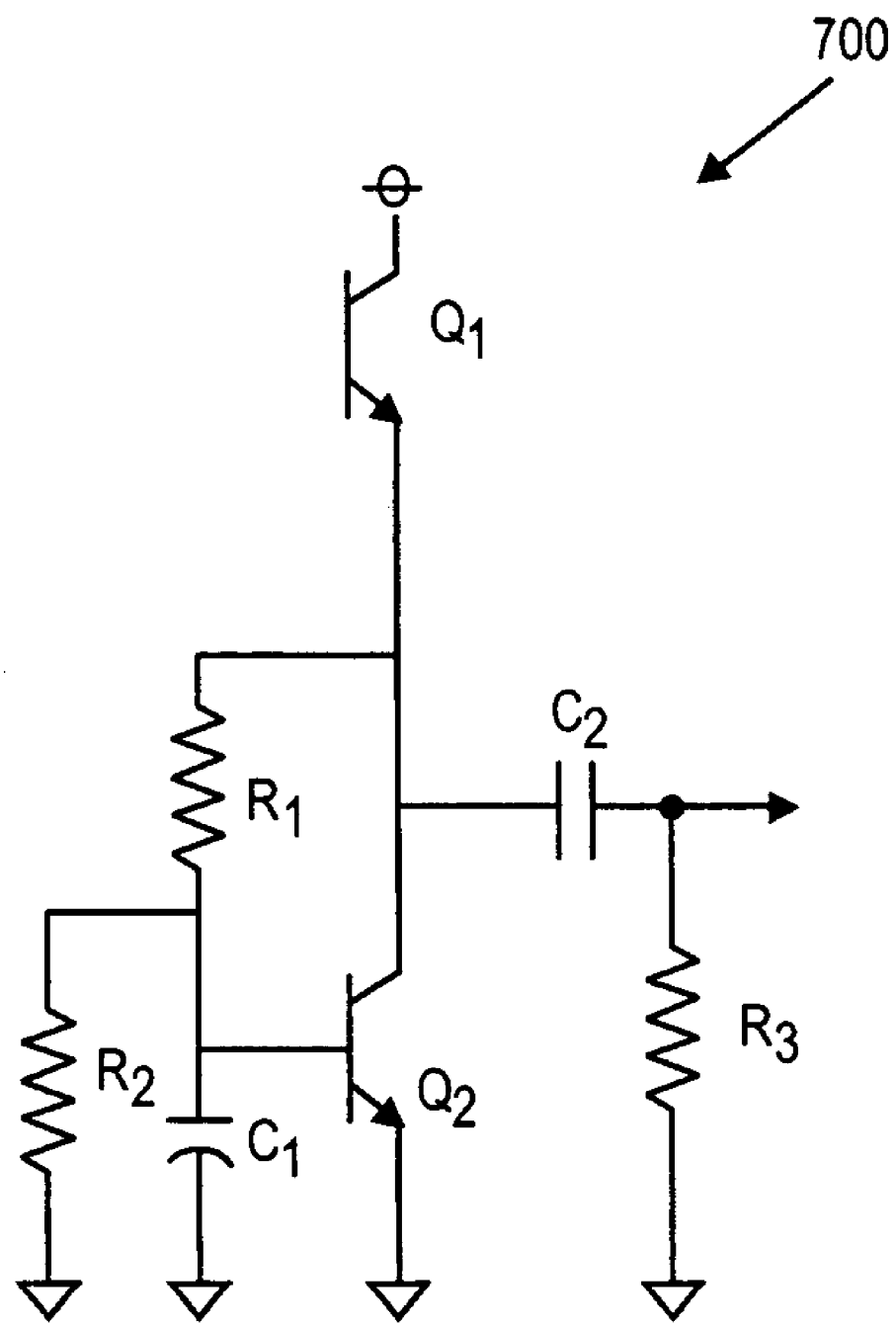
FIG. 7 is a diagram of a circuit for preventing an electromagnetic detector from saturating in a presence of high levels of ambient light, according to one embodiment of the invention.

In one embodiment, the cursor control device includes a circuit for preventing photodetector 630 from saturating in the presence of high levels of ambient light, such as daylight. FIG. 7 is a diagram of a circuit for preventing photodector 630 from saturating, according to one embodiment of the invention. Photodetector 630 generates current from light coming from various sources, including light emitted by LED 620 and daylight. The light coming from LED generates current with a large AC component, composed of a 400 Hz fundamental and some harmonics. The daylight generates current which may be considered stable (DC).

Referring to FIG. 7, phototransistor Q1 generates current depending upon the intensity of the light received by Q1. The current is then passed to phototransistor Q2. Q1, which is set up as a shunt voltage regulator, adjusts its collector current in such a way as to make the base of Q2 to be an average of one base-emitter drop above ground (about 0.6V). The average collector voltage of Q2 can be adjusted using R1. In one embodiment, R2 may be added to form a voltage divider with R1. With the addition of R2, the average collector voltage of Q2 may exceed the base voltage. It should be noted that the addition of R2 is optional. Typically, R2 is not required unless a large voltage swing needs to be provided on the collector of Q2 in order to accommodate a large offset on the comparator that follows circuit 700.

The capacitor on the base of Q2, along with R1, form a low-pass filter. Because of the low-pass filter which attenuates signals above a cut-off frequency, transistor Q2 does not respond to the 400 Hz current coming from LED 620. In turn, differentiator C2, along with R3, form a filter which does not pass the DC component of the signal. Accordingly, the output of circuit 700 contains only signal coming from LED 620.

Thus, methods and apparatus for controlling a cursor on a display screen of a digital processing system have been described. While the invention has been described in terms of several embodiments and illustrative figures, those skilled in the art will recognize that the invention is not limited to the embodiments or figures described. Therefore, it should be understood that the method and apparatus of the invention can be practiced with modification and alteration within the spirit and scope of the appended claims. The description is thus to be regarded as illustrative instead of limiting on the invention.

What is claimed is:

1. A movable cursor control device for controlling a cursor on a display screen of a digital processing system, the device comprising:
   a housing comprising a base having at least one aperture;
   at least one spacer, attached to the base of the housing, to keep the housing a distance L from a surface when the cursor control device is placed on the surface;
   an electromagnetic emitting device coupled to the housing; and
   an electromagnetic detector, coupled to the housing, to determine when the cursor control device has been lifted from the surface based on detecting reflections of signals emitted from the electromagnetic emitting device when the at least one aperture is within the distance L from the surface.

2. The device of claim 1 wherein the electromagnetic emitting device comprises a light emitting diode (LED).

3. The device of claim 2 wherein the electromagnetic detector comprises a photodetector.

4. The device of claim 1 wherein the at least one apertures comprises two apertures.

5. The device of claim 4 wherein the two apertures, the electromagnetic emitting device and the electromagnetic detector are located within the housing according to a predefined geometrical arrangement, the geometrical arrangement enabling the reflection of signals emitted from the electromagnetic emitting device to be visible to the electromagnetic detector when the housing is lifted within the distance L from the surface.

6. The device of claim 1 further comprising:
   an oscillator coupled to the electromagnetic emitting device;
   a signal detector coupled to the electromagnetic detector; and
   a low-pass filter coupled to the signal detector.

7. The device of claim 1 further comprising a circuit for preventing the electromagnetic detector from saturating in a presence of high levels of ambient light.

8. A computer-implemented method comprising:
   holding a cursor relative to an object on a display screen of a digital processing system using a cursor control device activated by a user;
   detecting that the user no longer activates the cursor control device;

detecting that the cursor control device has been lifted from the surface; and if the cursor control device lifted from the surface is likely to be deactivated by the user unintentionally, continuing to hold the cursor relative to the object after detecting that the user no longer activates the cursor control device.

9. The method of claim 8 further comprising releasing the cursor if the user does not resume activation of the cursor control device within a certain period of time following a return of the cursor control device to the surface.

10. The method of claim 8 further comprising:

determining that the cursor control device is likely to be deactivated by the user unintentionally using a set of timer values, the set of timer values being indicative of a user intent to continue holding the cursor relative to the object.

11. The method of claim 10 wherein the set of timer values comprises at least a first timer value, a second timer value, and a third timer value.

12. The method of claim 11 wherein the first timer value corresponds to a time interval during which the cursor control device was activated by the user.

13. The method of claim 11 wherein the second timer value corresponds to a time delay between detecting that the user no longer activates the cursor control device and detecting that the user has lifted the cursor control device.

14. The method of claim 11 wherein the third timer value corresponds to a time delay between returning the cursor control device to the surface and resuming activation of the cursor control device by the user.

15. The method of claim 10 wherein the set of timer values are either specified by the user or defined programmatically.

16. A computer-implemented apparatus comprising:

a first means for holding a cursor relative to an object on a display screen of a digital processing system using a cursor control device activated by a user;

a second means for detecting that the user no longer activates the cursor control device;

a third means for detecting that the cursor control device has been lifted from the surface; and a fourth means for continuing to hold the cursor relative to the object after detecting that the user no longer activates the cursor control device, if the cursor control device lifted from the surface is likely to be deactivated by the user unintentionally.

17. The apparatus of claim 16 further comprising a fifth means for releasing the cursor if the user does not resume activation of the cursor control device within a certain period of time following a return of the cursor control device to the surface.

18. The apparatus of claim 16 further comprising a sixth means for determining that the cursor control device was likely to be deactivated by the user unintentionally, the set of timer values being indicative of a user intent to continue holding the cursor relative to the object.

19. The apparatus of claim 17 wherein the set of timer values comprises at least a first timer value, a second timer value, and a third timer value.

20. The apparatus of claim 19 wherein the first timer value corresponds to a time interval during which the cursor control device was activated by the user.

21. The apparatus of claim 19 wherein the second timer value corresponds to a time delay between detecting that the user no longer activates the cursor control device and detecting that the user has lifted the cursor control device.

22. The apparatus of claim 19 wherein the third timer value corresponds to a time delay between returning the cursor control device to the surface and resuming activation of the cursor control device by the user.

23. A machine readable medium comprising executable instructions which when executed on a processing system cause said processing system to perform a method comprising:

holding a cursor relative to an object on a display screen of a digital processing system using a cursor control device activated by a user;

detecting that the user no longer activates the cursor control device;

detecting that the cursor control device has been lifted from the surface; and if the cursor control device lifted from the surface is likely to be deactivated by the user unintentionally, continuing to hold the cursor relative to the object after detecting that the user no longer activates the cursor control device.

24. The medium of claim 23 wherein said method further comprises releasing the cursor if the user does not resume activation of the cursor control device within a certain period of time following a return of the cursor control device to the surface.

25. The medium of claim 23 wherein a determination that the cursor control device was likely to be deactivated by the user unintentionally is made using a set of timer values, the set of timer values being indicative of a user intent to continue holding the cursor relative to the object.

26. The medium of claim 25 wherein the set of timer values comprises at least a first timer value, a second timer value, and a third timer value.

27. The medium of claim 26 wherein the first timer value corresponds to a time interval during which the cursor control device was activated by the user.

28. The medium of claim 26 wherein the second timer value corresponds to a time delay between detecting that the user no longer activates the cursor control device and detecting that the user has lifted the cursor control device.

29. The medium of claim 26 wherein the third timer value corresponds to a time delay between returning the cursor control device to the surface and resuming activation of the cursor control device by the user.

* * * * *